(12) United States Patent
Bonde

(10) Patent No.: US 12,478,786 B1
(45) Date of Patent: Nov. 25, 2025

(54) ELECTRODE DEVICES AND METHODS FOR NEUROSTIMULATION TREATMENT

(71) Applicant: Restora Medical, Inc., Irvine, CA (US)

(72) Inventor: Eric Bonde, Minnetonka, MN (US)

(73) Assignee: Restora Medical, Inc., Irvine, CA (US)

( * ) Notice: Subject to any disclaimer, the term of this patent is extended or adjusted under 35 U.S.C. 154(b) by 0 days.

(21) Appl. No.: 18/811,244

(22) Filed: Aug. 21, 2024

(51) Int. Cl.
*A61N 1/36* (2006.01)
*A61N 1/05* (2006.01)

(52) U.S. Cl.
CPC .......... *A61N 1/3611* (2013.01); *A61N 1/0556* (2013.01)

(58) Field of Classification Search
CPC ............................ A61N 1/3611; A61N 1/0556
See application file for complete search history.

(56) References Cited

U.S. PATENT DOCUMENTS

| 9,227,053 | B2 | 1/2016 | Bonde |
| 2011/0147046 | A1* | 6/2011 | Bonde ................. A61N 1/0556 174/126.1 |
| 2012/0022626 | A1 | 1/2012 | Bolea |

* cited by examiner

*Primary Examiner* — Lynsey C Eiseman
*Assistant Examiner* — Philip C Edwards
(74) *Attorney, Agent, or Firm* — COOLEY LLP

(57) ABSTRACT

At least some embodiments of the present disclosure are directed to systems and methods for sleep disordered breathing (e.g., obstructive sleep apnea) therapy. An electrode assembly includes a cuff body to wrap around a nerve. The cuff body includes an inner layer to form a hollowed cylinder shape, and an outer layer to overlap at least a part of the inner layer and cover a closeable opening of the inner layer. Electrode elements are at least partially embedded within the inner layer and spaced apart from each other along a longitudinal direction. The electrode elements each include an arcuate portion facing a lumen of the inner layer. The electrode assembly has a cross-sectional shape that is substantially circular.

17 Claims, 9 Drawing Sheets

ELECTRODE DEVICES AND METHODS FOR NEUROSTIMULATION TREATMENT

BACKGROUND

Obstructive sleep apnea (OSA) is a common sleep-related breathing disorder. OSA may occur when the muscles in the back of the throat relax during sleep, causing a partial or complete blockage of the airway. Typical treatment options may include positive airway pressure (PAP) therapy using devices like continuous positive airway pressure (CPAP) to help keep the airway open during sleep, and oral appliances using custom-made mouthpieces to reposition the jaw and tongue to prevent airway collapse.

SUMMARY

Certain embodiments of the present disclosure relate to medical devices, systems, and methods for sleep disordered breathing (e.g., obstructive sleep apnea) therapy. More specifically, some embodiments of the present disclosure relate to electrode implementations for medical devices, systems, and methods for obstructive sleep apnea therapy through upper airway neurostimulation.

According to some embodiments, an electrode assembly includes a cuff body configured to wrap around a nerve and extending along a longitudinal direction from a proximal end to a distal end. The cuff body includes an inner layer configured to form a hollowed cylinder shape including a cylinder wall defining a lumen and a closeable opening on the cylinder wall accessible to the lumen, the lumen and the closeable opening extending along the longitudinal direction, and an outer layer configured to overlap at least a part of the inner layer and cover the closeable opening. One or more electrode elements are at least partially embedded within the cylinder wall and spaced apart from each other along the longitudinal direction, the one or more electrode elements each including an arcuate portion facing the lumen. The electrode assembly has a cross-sectional shape that is substantially circular.

According to certain embodiments, a method of making an electrode assembly includes forming an inner layer having a hollowed cylinder shape including a cylinder wall defining a lumen and a closeable opening on the cylinder wall accessible to the lumen, the lumen and the closeable opening extending along a longitudinal direction, at least partially embedding one or more electrode elements within the cylinder wall, the one or more electrode elements being spaced apart from each other along the longitudinal direction, the one or more electrode elements each including an arcuate portion facing the lumen, and wrapping an outer layer over the inner layer to overlap at least a portion of the inner layer and covering the closeable opening. The electrode assembly has a cross-sectional shape that is substantially circular.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

Figure 1:
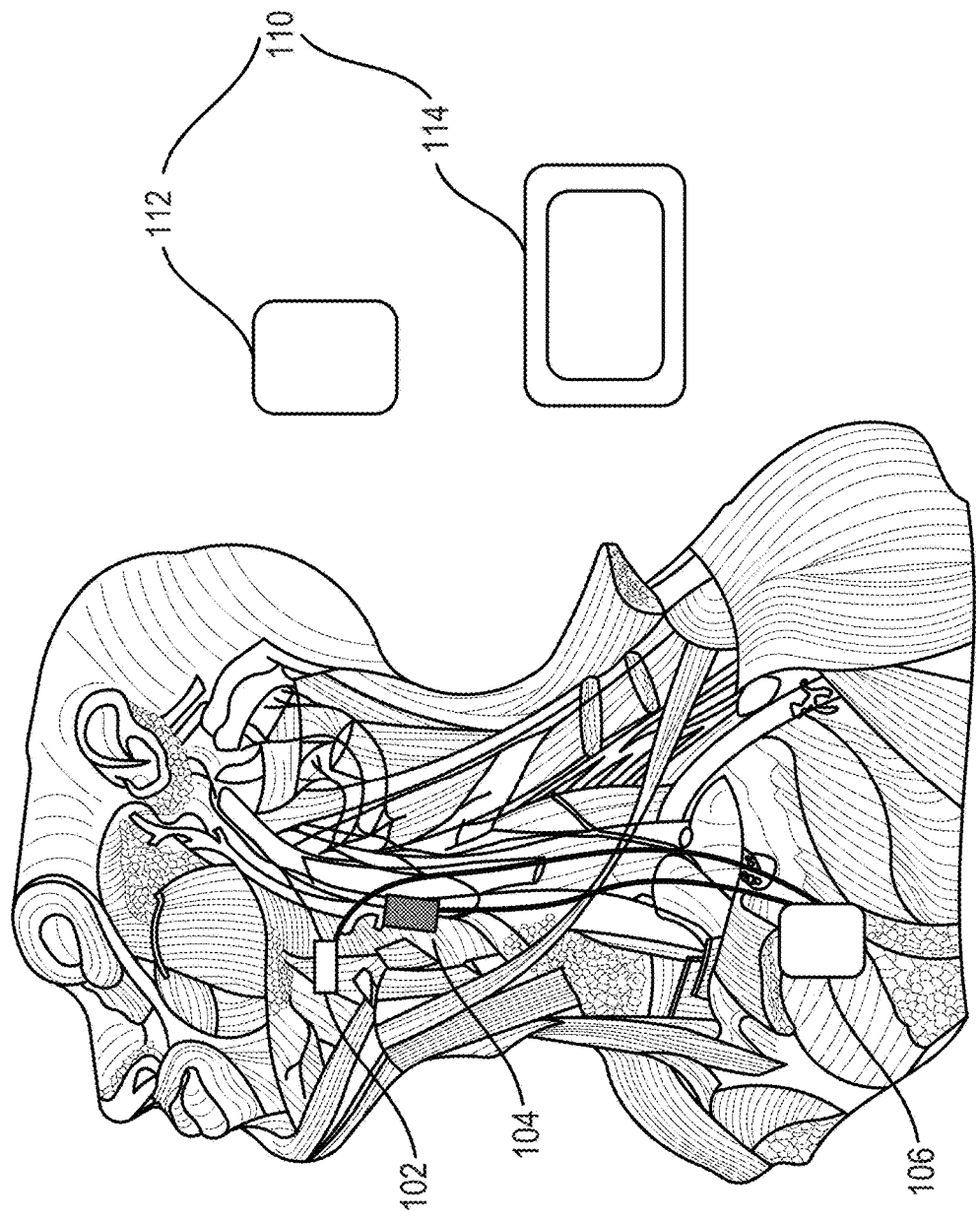
FIG. 1 illustrates a schematic diagram representing patient anatomy and an example medical system for upper airway neurostimulation, in accordance with embodiments of the present disclosure.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The following detailed description is exemplary in nature and is not intended to limit the scope, applicability, or configuration of the disclosure in any way. Rather, the following description provides some practical illustrations for implementing exemplary embodiments of the present disclosure. Examples of constructions, materials, and/or dimensions are provided for selected elements. Those skilled in the art will recognize that many of the noted examples have a variety of suitable alternatives.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any number within that range.

Although illustrative methods may be represented by one or more drawings (e.g., flow diagrams, communication flows, etc.), the drawings should not be interpreted as implying any requirement of, or particular order among or between, various steps disclosed herein. However, some embodiments may require certain steps and/or certain orders between certain steps, as may be explicitly described herein and/or as may be understood from the nature of the steps themselves (e.g., the performance of some steps may depend on the outcome of a previous step). Additionally, a "set,"

"subset," or "group" of items (e.g., inputs, algorithms, data values, etc.) may include one or more items and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information. In some embodiments, the term "receive" or "receiving" means obtaining from a data repository (e.g., database), from another system or service, from another software, or from another software component in a same software. In certain embodiments, the term "access" or "accessing" means retrieving data or information, and/or generating data or information.

At least some embodiments of the present disclosure are directed to electrode implementations for medical systems, devices, and methods for nerve stimulation. For example, hypoglossal nerve stimulation (HNS) is considered as an effective form of therapy for patients with obstructive sleep apnea (OSA). In a typical method for stimulating airway patency-related tissue using hypoglossal nerve stimulation (HNS), an implanted neurostimulator is used to generate stimulation signals to deliver to an implanted stimulation lead or electrode. The implanted electrode can be positioned at or adjacent to a target nerve or a nerve branch for nerve stimulation and muscle activation, e.g., protruding and stiffening the tongue muscle thereby reducing obstruction from the tongue. However, it can be challenging to place a stimulation lead or electrode on a peripheral nerve for neurostimulation without causing injuries. For example, the interfacing of the electrode with the nerve may cause injury to the nerve acutely and/or chronically. Acutely, the nerve may swell after the required manipulation of the nerve during implant, and a restriction on the nerve swelling imposed by the implanted electrode may cause injury. Chronically, the implanted electrode may cause irritation and undesirable tissue response such as excessive fibrotic and scar tissue growth, which may change stimulation threshold requirements and even push the electrode off the nerve. As such, ways to improve electrode implementation for neurostimulation are needed. At least some embodiments of the present disclosure are directed to electrode implementations for medical systems, devices, and methods for neurostimulation, for example, for obstructive sleep apnea (OSA) therapy in a patient through airway neurostimulation.

FIG. 1 illustrates a schematic diagram representing patient anatomy and a system 100 for upper airway neurostimulation for a person, in accordance with embodiments of the present disclosure. The system 100 includes a first implantable electrode 102 configured to deliver a first stimulation signal proximate to a first nerve of the person to stimulate the first nerve and activate at least one muscle for an upper airway dilation of the person. In some embodiments, the system 100 further includes a second implantable electrode 104 configured to deliver a second stimulation signal proximate to a second nerve to stimulate the second nerve and activate at least one muscle for a caudal tracheal traction for an upper airway of the person.

In some embodiments, the system 100 further includes a stimulation signal generator 106 configured to deliver the first stimulation signal to the first implantable electrode 102 and deliver the second stimulation signal to the second implantable electrode 104. The stimulation signal generator 106 can be positioned (e.g., implanted) in any suitable locations and be connected to the implantable electrodes 102 and 104 wirelessly or via wires. In some embodiments, the stimulation signal generator 106 is implanted in or on a patient's body, for example, in the chest, adjacent to the implantable electrodes 102 and 104. In some embodiments, the implantable electrodes 102 and 104 can be operably coupled to the same, single stimulation signal generator 106. In some embodiments, the stimulation signal generator 106 can include a first stimulation signal generator coupled to the first implantable electrode 102 and a second stimulation signal generator coupled to the second implantable electrode 104. The first and second stimulation signal generators can be disposed within the same physical housing or separate housings.

In certain embodiments, the system 100 includes only one implantable electrode. In some embodiments, the system 100 includes two or more implantable electrodes. In certain embodiments, an implantable electrode includes one or more electrode elements.

According to certain embodiments, the stimulation signal generator 106 can be controlled to generate one or more stimulation signals and deliver the generated stimulation signals to one or more electrodes. In some embodiments, the stimulation signal generator 106 can be controlled to convey various patterns of electrical currents and voltages to generate the stimulation signals.

In some embodiments, the stimulation signal generator 106 can be a pulse generator to generate a series of pulses in the stimulation period of each stimulation cycle. The stimulation signal generator 106 can control the one or more stimulation parameters of the pulse signal, including one or more of an amplitude, a frequency, a pulse width, a rate of amplitude change, a duty cycle, and the like. In some embodiments, the stimulation parameters may be greater than certain stimulation thresholds to be effective. The stimulation thresholds may depend on the deployment or placement of electrodes with respect to the target nerve.

In some embodiments, the system 100 further includes a controller 110 functionally connected to the stimulation signal generator 106 to control operation of the stimulation signal generator. In some embodiments, the controller 110 is configured to control or adjust one or more stimulation parameters for the stimulation signal generator 106 including, for example, a duration of stimulation cycle, a duration of a stimulation period, a duration of a non-stimulation period, a coordination between a first stimulation signal and a second stimulation signa, a pulse amplitude, a pulse frequency, a pulse width, a duty cycle of the generated stimulation signal, and the like. In some embodiments, the controller 110 allows a user to adjust a first amplitude of the first stimulation signal and a second amplitude of the second stimulation signal to obtain an optimized combination of the first amplitude and the second amplitude.

In the embodiment depicted in FIG. 1, the controller 110 includes a first controller 112 and a second controller 114. In some embodiments, the first controller 112 can be a patient remote controller for a patient to control operation of the stimulation signal generator 106. For example, the patient can use the controller to turn on or turn off the stimulation signal generator 106, to adjust the respective amplitudes of one or more stimulation signals, to switch the operation of the stimulation signal generator 106 between a first mode and a second mode, and the like. In some embodiments, the controller 110 can automatically turn on or off the stimulation signal generator 106 based on the time of day. In some embodiments, the second controller 114 can be a clinician programming device for a physician or clinician to adjust one or more stimulation parameters for the stimulation signal generator 106.

In some embodiments, the first implantable electrode 102 is configured to deliver the first stimulation signal proximate to a hypoglossal nerve to stimulate the hypoglossal nerve and activate at least one tongue muscles. In some embodiments, the second implantable electrode 104 is configured to deliver a second stimulation signal proximate to an ansa cervicalis nerve to stimulate the ansa cervicalis nerve and activate at least one infrahyoid muscle.

In some embodiments, the first stimulation signal is delivered to activate one or more protrusor muscles of the tongue (e.g., genioglossus) to displace tongue base anteriorly for hypoglossal nerve stimulation (HNS), which can pull soft palate anteriorly and stiffen the pharyngeal lateral wall antero-posteriorly. In some embodiments, the second stimulation signal is delivered to activate one or more infrahyoid muscles to descend a hyoid-thyroid complex, which results in a trachea caudal traction that stiffens the pharyngeal lateral wall and posterior wall inferiorly for ansa cervicalis nerve stimulation (ACS).

According to certain embodiments, an implantable electrode (e.g., 102 or 104 of FIG. 1) can include an electrode assembly to be placed on a peripheral nerve (e.g., hypoglossal nerve(s) and ansa cervicalis nerve(s)). The nerves can innervate certain muscles in a tongue and (strap) muscles in a neck of a patient. Stimulation of the muscles can provide therapy for obstructive sleep apnea by opening the airway when the muscles are contracted via stimulation.

According to some embodiments, the electrode assembly can be placed around a target nerve. The electrode assembly can include a cuff body to wrap around the target nerve and interface with the target nerve without causing significant injury to the nerve acutely and chronically. One or more electrode elements can be supported by the cuff body and be positioned in close proximity to the target nerve to provide stimulation with relatively low stimulation thresholds.

According to certain embodiments, the cuff body of the electrode assembly can accommodate the swelling of the nerve. Acutely, a nerve may swell after certain manipulation of the nerve during implant. Such a nerve swelling can be accommodated by the cuff body without excessive restriction on the nerve and without causing significant injury.

In some embodiments, the cuff body of the electrode assembly can be compliant with a patient's body. For example, the cuff body can have a substantially round and smooth outer surface, without protrusions, bumps, or edges on the outer surface thereof. Such a round and smooth outer surface of the cuff body can provide relatively better interfacing with the surrounding tissue, avoid of possible irritation and undesirable tissue response such as, for example, excessive fibrotic and scar tissue growth. The cuff body can prevent such a tissue growth which may cause a dramatical change of stimulation threshold and even push the cuff body off the nerve.

According to some embodiments, an electrode assembly described herein can be made or modified to be applicable to a wide range of peripheral nerve sizes and to various therapies that desire different nerve stimulation and the accompanying muscle activation. In some embodiments, the electrode assembly may apply to sensory or mixed nerves for therapies intending to either stimulate pathways or sense nerve traffic.

Figure 2:
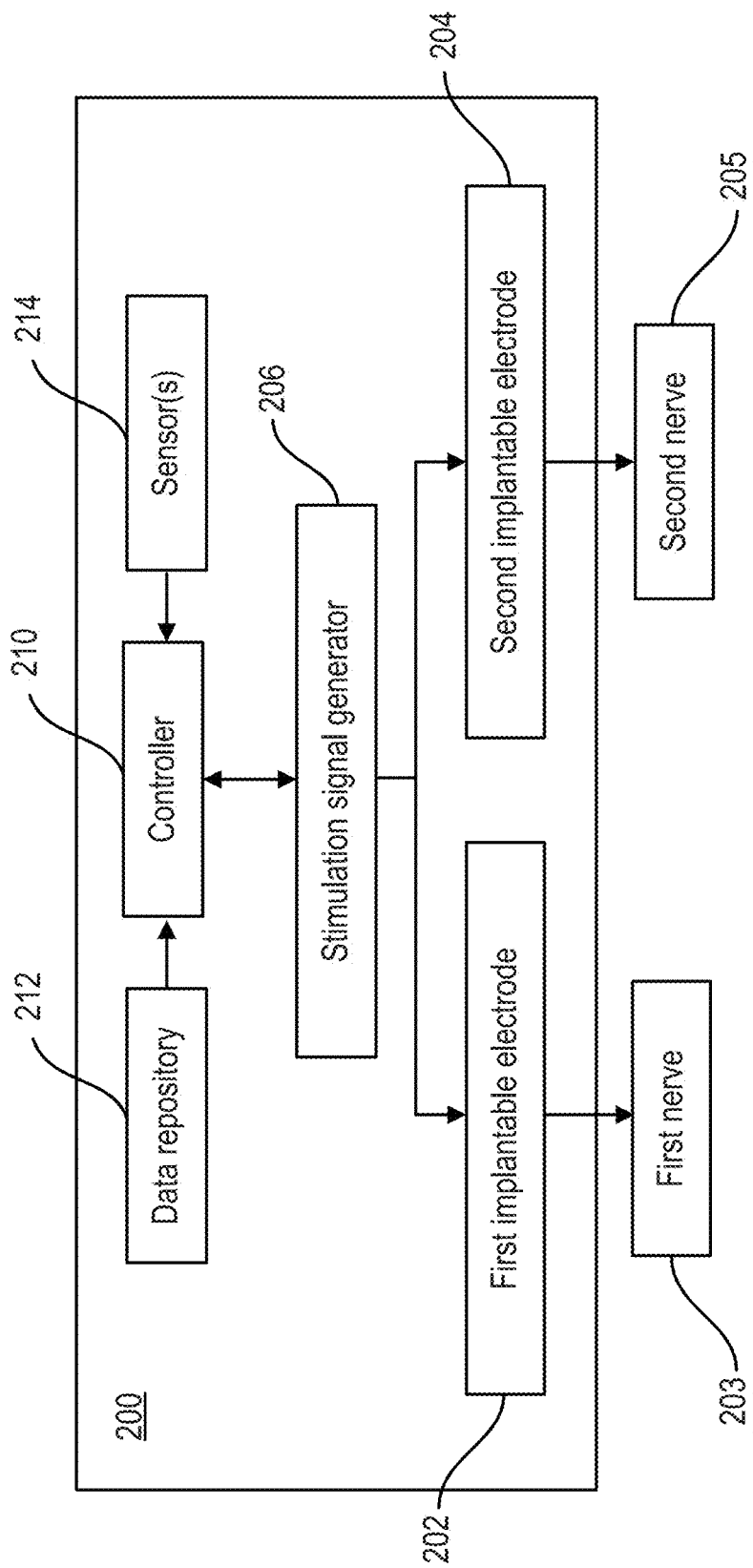
FIG. 2 is a block diagram of an example medical system for obstructive sleep apnea therapy of a patient through upper airway neurostimulation, in accordance with embodiments of the present disclosure.

FIG. 2 is a block diagram of a medical system 200 for obstructive sleep apnea therapy in a patient through upper airway neurostimulation, in accordance with embodiments of the present disclosure.

In some embodiments, the medical system 200 includes a first implantable electrode 202 configured to deliver a first stimulation signal proximate to a first nerve 203 of the person to stimulate the first nerve 203, a second implantable electrode 204 configured to deliver a second stimulation signal proximate to a second nerve 205.

In some embodiments, the first implantable electrode 202 is configured to deliver the first stimulation signal proximate to a hypoglossal nerve to stimulate the hypoglossal nerve and activate at least one tongue muscle. In some embodiments, the second implantable electrode 204 is configured to deliver a second stimulation signal proximate to an ansa cervicalis nerve to stimulate the ansa cervicalis nerve and activate at least one infrahyoid muscle. In some embodiments, the medical system 200 can include a third implantable electrode configured to deliver a third stimulation signal proximate to a third nerve to stimulate the third nerve. The third nerve can be, for example, a phrenic nerve.

In certain embodiments, the medical system 200 can include only one implantable electrode. In some embodiments, the medical system 200 can include two or more implantable electrodes. In certain embodiments, an implantable electrode can include one or more electrode elements.

In some embodiments, the medical system 200 further includes a stimulation signal generator 206 configured to deliver the first stimulation signal to the first implantable electrode 202 and deliver the second stimulation signal to the second implantable electrode 204. The first stimulation signal has a series of first stimulation cycles including a first stimulation period and a first non-stimulation period. The second stimulation signal has a series of second stimulation cycles including a second stimulation period and a second non-stimulation period. The delivery of the first stimulation signal is coordinated with the delivery of the second stimulation signal.

In some embodiments, the stimulation signal generator 206 can include one or more pulse generators each configured to generate a stimulation signal including a series of stimulation cycles including a stimulation period and a non-stimulation period. A stimulation period of a stimulation cycle can include a series of stimulation pulses having one or more pulse parameters. Example pulse parameters include a pulse frequency, an amplitude, a pulse width, a duty cycle, and the like. A pulse frequency can be, for example, from about 5 Hz to about 40 Hz (e.g., at or about 30 Hz). A pulse width can be, for example, from about 10 microseconds to about 1000 microseconds (e.g., at or about 100 microseconds). A duty cycle can refer to a percentage of a duration of stimulation at a pulse amplitude to a duration of a stimulation cycle (e.g., the sum of a duration of stimulation and a duration of no stimulation). A duration of a stimulation cycle can be, for example, in the range from 2 seconds to 10 minutes. A duty cycle can be, for example, in a range from about 5 percent to 95 percent. A pulse amplitude may refer to the difference between a higher voltage level and a lower voltage level. A pulse amplitude can be, for example, in the range from 0.1 to 15 volts or 0.1 to 15 mA.

In some embodiments, the medical system 200 further includes a controller 210 functionally connected to the stimulation signal generator 206 to control operation of the stimulation signal generator. In some embodiments, the controller 210 is a remote controller configured to control one or more stimulation parameters for the stimulation signal generator 106 including, for example, one or more of an amplitude, a frequency, a pulse width, a rate of amplitude change, a duty cycle, and the like, of the generated stimulation signal.

In some embodiments, the controller 210 can include a patient remote controller for a patient to control operation of the stimulation signal generator 206 including, for example, to turn on or off the stimulation signal generator 206, to adjust the respective amplitudes of one or more stimulation signals, to switch the operation of the stimulation signal generator 106 from a first mode to a second mode, and the like.

In some embodiments, the controller 210 can include a clinician programming device for a physician or clinician to pre-program the stimulation signal generator 206 with desired stimulation parameters. The stimulation parameters can be controllable to allow one or more stimulation signals be remotely modulated to desired settings without removal of the corresponding electrodes from their target positions.

In some embodiments, the controller 210 can include one or more computing devices each of which can include a bus that, directly and/or indirectly, couples the following devices: a processor, a memory, an input/output (I/O) port, an I/O component, and a power supply. Any number of additional components, different components, and/or combinations of components may also be included in the computing device. The bus represents what may be one or more busses (such as, for example, an address bus, data bus, or combination thereof). Similarly, in some embodiments, the computing device may include a number of processors, a number of memory components, a number of I/O ports, a number of I/O components, and/or a number of power supplies. Additionally, any number of these components, or combinations thereof, may be distributed and/or duplicated across a number of computing devices.

In some embodiments, the medical system 200 further includes one or more sensors 214. In certain embodiments, the sensors 214 can be external sensors configured to detect one or more physiological information of the patient, including, for example, the apnea-hypopnea index (AHI), the oxygen desaturation index (ODI), the respiratory disturbance index (RDI), a posture change, a sleep stage, a body motion for restlessness, and the like.

According to certain embodiments, the sensors 214 can generate a sensor signal based on the physiological parameters or changes and send the sensor signal to the controller 210. The controller 210 can process the sensor signal and control/adjust one or more stimulation parameters of the stimulation signal generator 206 based, at least in part, on the one or more physiological parameters.

In some embodiments, the sensors 214 can send the related sensing data to the controller 210 to determine whether a patient is entering a stable sleep. When the controller 210 determines that the patient is entering a stable sleep, the controller 210 can retrieve a stored therapy setting from the data repository and send the therapy setting to the stimulation signal generator 206 to adjust the corresponding one or more first stimulation parameters of the first stimulation signal and/or one or more first stimulation parameters of the second stimulation signal.

In some embodiments, the medical system 200 further includes a data repository 212 to store data for the medical system 200. In some embodiments, the data repository 212 can be implemented using any one of the memory or storage configurations described below. A data repository can include random access memories, flat files, XML files, and/or one or more database management systems (DBMS) executing on one or more database servers or a data center. A database management system can be a relational (RDBMS), hierarchical (HDBMS), multidimensional (MDBMS), object oriented (ODBMS or OODBMS) or object relational (ORDBMS) database management system, and the like. The data repository can be, for example, a single relational database. In some cases, the data repository may include one or more databases that can exchange and aggregate data by a data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

Various components of the medical system 200 can communicate via or be coupled to via a communication network or interface, for example, a wired or wireless network or interface. The communication network or interface can be any suitable communication network or combination of communication networks. For example, communication network can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, and the like. In some examples, communication network can be a local area network (LAN), a wide area network (WAN), a public network (e.g., the Internet), a private or semi-private network (e.g., a corporate or university intranet), any other suitable type of network, or any suitable combination of networks. Communication links (arrows) between components of the medical system 200 can each be any suitable communication link or combination of communication links, such as wired links, fiber optics links, Wi-Fi links, Bluetooth links, cellular links, and the like.

As described above, according to certain embodiments, one or more electrodes can be implanted to enable stimulation of one or more nerves (e.g., a hypoglossal nerve, an ansa cervicalis nerve, and the like) or nerve branches. An implantable electrode can be positioned in close proximity to the relevant target nerve or muscle location(s) for nerve stimulation. According to some embodiments, an implantable electrode can include a cuff electrode placed around a target nerve or nerve branch. For example, in some embodiments, the first implantable electrode 202 of FIG. 2 can include one or more first electrode assemblies each including a cuff body configured to wrap around a hypoglossal nerve. One or more first electrode elements can be supported by the cuff body to deliver a first stimulation signal to the hypoglossal nerve to stimulate the hypoglossal nerve and activate at least one tongue muscle. In some embodiments, the second implantable electrode 204 of FIG. 2 can include one or more second electrode assemblies each including a cuff body configured to wrap an ansa cervicalis nerve. One or more second electrode elements can be supported by the cuff body to deliver a second stimulation signal to the ansa cervicalis nerve to stimulate the ansa cervicalis nerve and activate at least one infrahyoid muscle.

According to some embodiments, an electrode assembly includes a cuff body configured to wrap around a nerve and extending along a longitudinal direction from a proximal end to a distal end thereof. The cuff body includes an inner layer configured to form a hollowed cylinder shape including a cylinder wall defining a lumen and a closeable opening on the cylinder wall accessible to the lumen. Each of the lumen and the closeable opening extends along the longitudinal direction of the cuff body. An outer layer is configured to overlap at least a part of the inner layer and cover the closeable opening. One or more electrode elements are at least partially embedded within the cylinder wall and spaced apart from each other along the longitudinal direction. Each of the electrode elements can include an arcuate portion facing the lumen of the inner layer.

According to some embodiments, the electrode assembly has a cross-sectional shape that is substantially circular. The cylinder wall of the inner layer has a cross-sectional shape that is substantially circular to allow the outer layer to overlap with the inner layer with a substantially same curvature even when the outer layer wraps around the inner layer with more than one revolution.

Figure 3:
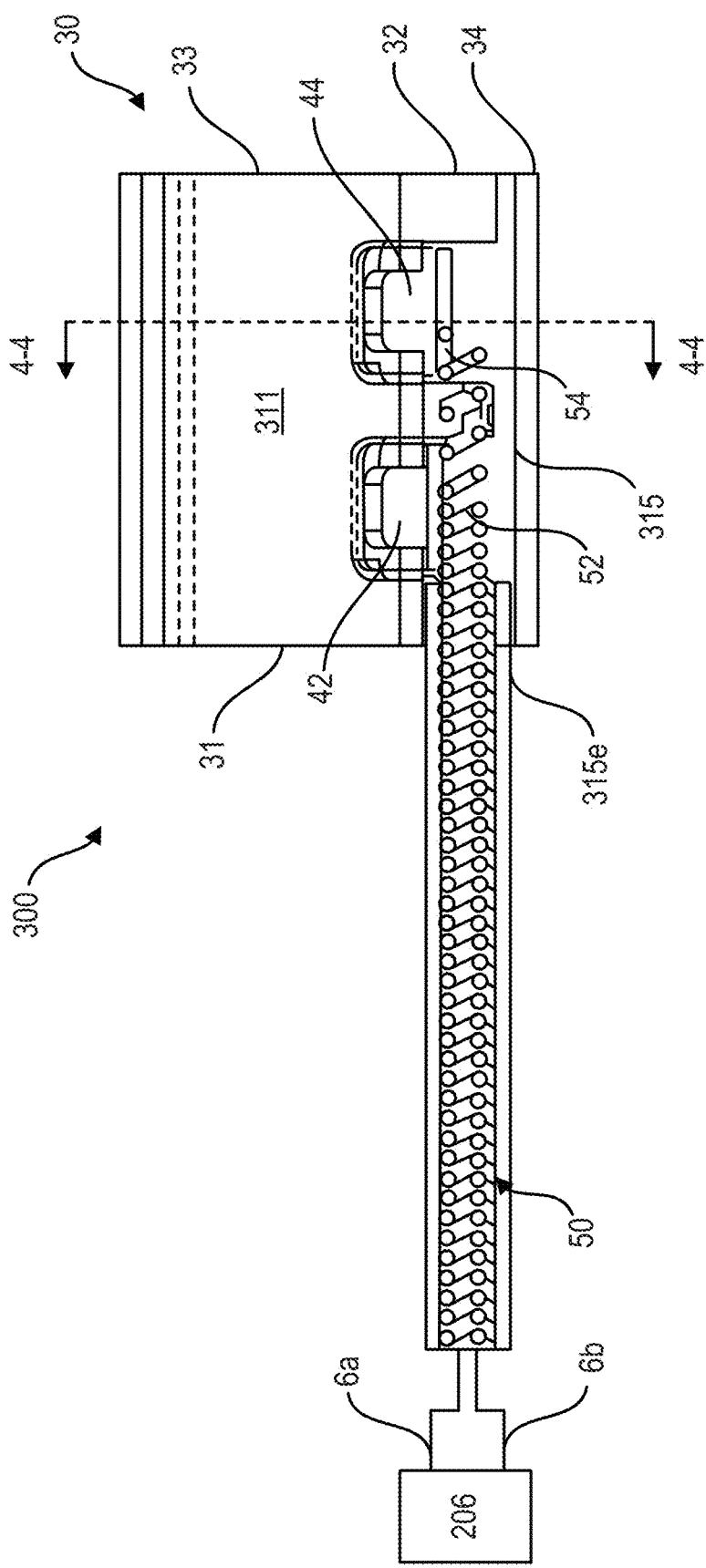
FIG. 3 is a side sectional view of an example electrode assembly, in accordance with embodiments of the present disclosure.
Figure 4:
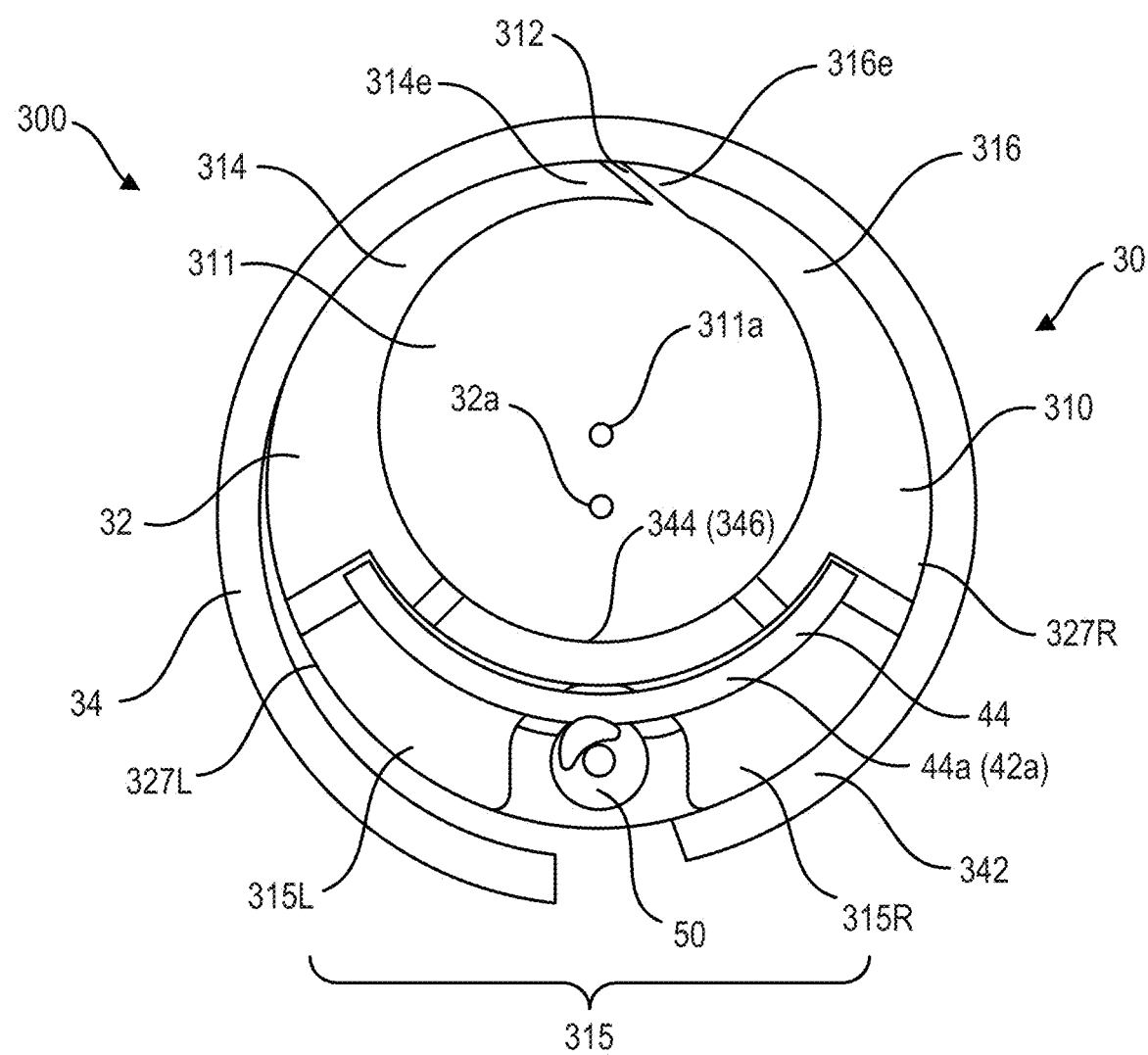
FIG. 4 is a cross-sectional view of the electrode assembly of FIG. 3, in accordance with embodiments of the present disclosure.
Figure 5:
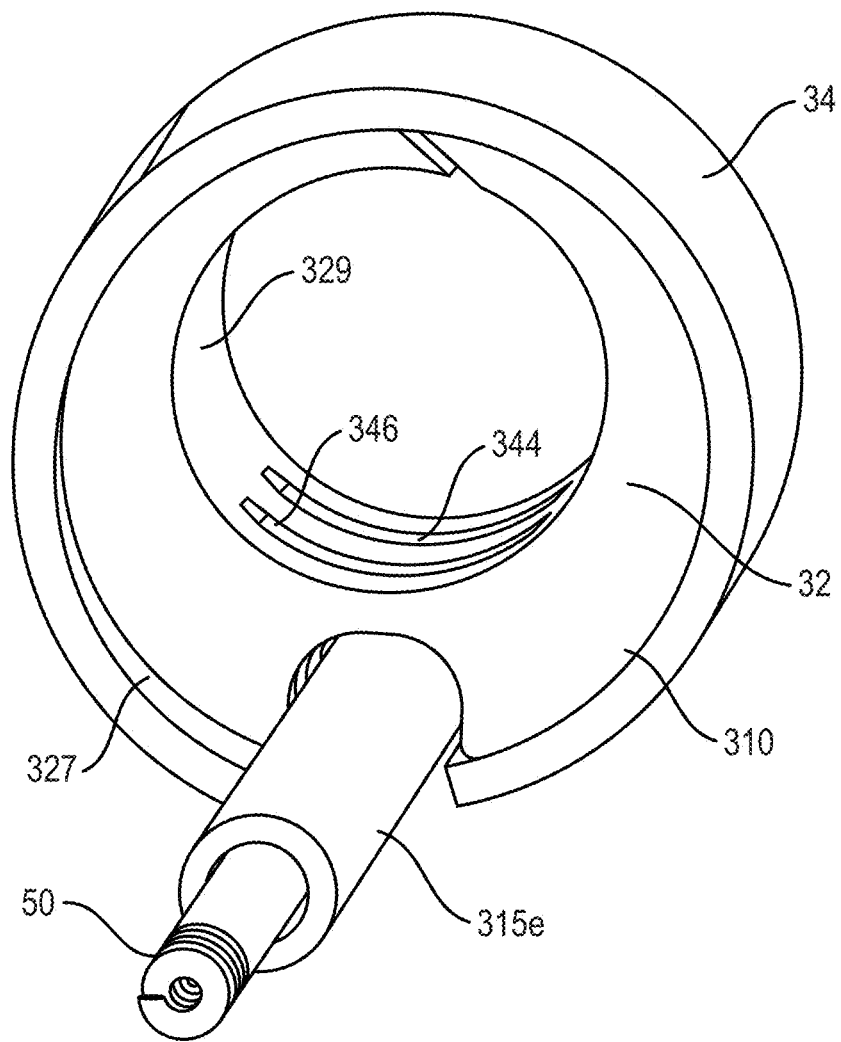
FIG. 5 is a perspective view of the electrode assembly of FIG. 3, in accordance with embodiments of the present disclosure.

FIG. 3 is a side sectional view of an example electrode assembly 300, in accordance with embodiments of the present disclosure. FIG. 4 is a cross-sectional view of the electrode assembly of FIG. 3 along the line 4-4. FIG. 5 is a perspective view of the electrode assembly 300 of FIG. 3.

In some embodiments, the electrode assembly 300 includes a cuff body 30 configured to wrap around a nerve (e.g., a hypoglossal nerve, an ansa cervicalis nerve, and the like). The cuff body 30 extends along a longitudinal direction from a proximal end 31 to a distal end 33.

In some embodiments, a length of the cuff body 30 can be in a range, for example, from 2.0 mm to 10.0 mm, from 2.0 mm to 8.0 mm, from 4.0 mm to 8.0 mm, or from 4.0 mm to 7.0 mm. The cuff body 30 can have an outer diameter in the range, for example, from 3.0 mm to 6.0 mm. The cuff body 30 defines a lumen 311 having an inner diameter in the range, for example, from 1.5 mm to 3.5 mm.

It is to be understood that the dimensions/sizes of the electrode assembly and the relevant components may depend on the dimensions/sizes of target nerves (e.g., hypoglossal, and ansa cervicalis). In some embodiments, there is a desire to make the cuff body relatively smaller, while still providing sufficient surface area for stimulating electrode(s) for "safe" stimulation as defined by the related current density. While a relatively longer cuff body allows the electrodes to be wider and provide relatively larger surface areas, there might be a physical constraint on the length of the cuff body (i.e., an upper limit of the length of the cuff body) such that the cuff body can fit on the nerve body in an area between nerve branches. In some embodiments, an upper limit of the length of the cuff body can be, for example, 9 mm or less, 8 mm or less, 7 mm or less, or about 6 mm, which is a significant improvement over the lengths (e.g., about 10 mm or longer) of typical cuff bodies commercially available.

In some embodiments, the cuff body 30 includes an inner layer 32 configured to form a hollowed cylinder shape including a cylinder wall 310 defining the lumen 311 and a closeable opening 312 on the cylinder wall 310 accessible to the lumen 311. The lumen 311 and the closeable opening 312 extend along the longitudinal direction.

As shown in the embodiment of FIG. 4, the cylinder wall 310 includes a first portion 315 opposite the closeable opening 312. The cylinder wall 310 further includes a pair of resilient portions 314 and 316 that have a generally arcuate shape and extend from the opposite sides of the first portion 315. The resilient portions 314 and 316 have the respective ends 314e and 316e opposite each other, which can be pulled apart from each other to create the closeable opening 312 and provide an access to the lumen 311 for engaging a target nerve. In some embodiments, each of the resilient portions 314 and 316 has a thickness tapered toward the closeable opening 312.

According to some embodiments, one or more electrode elements can be at least partially embedded within the first portion 315 of the inner layer 32. As shown in FIG. 3, a first electrode element 42 and a second electrode element 44 are at least partially embedded within the inner layer 32 and spaced apart from each other along the longitudinal direction. The first electrode element 42 is positioned adjacent to the first end 31. The second electrode element 44 is positioned adjacent to the second end 33. As shown in FIG. 4, each of the first and second electrode elements 42 and 44 include an arcuate portion 42a/44a facing the lumen 311. In some embodiments, the electrode elements 42 and 44 can be positioned such that the middle portions of the arcuate portions 42a and 44a are opposite the closeable opening 312.

As shown, the first portion 315 of the cylinder wall 310 includes an array of windows 344 and 346 to expose the arcuate portions 42a and 44a corresponding to the electrode elements 42 and 44, respectively (see also FIG. 5). In some embodiments, the exposed arcuate portions 42a and 44a can have the exposed surfaces being substantially flush with the inner surface 329 of the inner layer 32. The arcuate portions 42a and 44a can have a curvature substantially the same as the inner surface 329. In some embodiments, each of the arcuate portions 42a and 44a can have a corresponding angle in a range, for example, from 45 degrees to 180 degrees, from 60 degrees to 180 degrees, or from 75 degrees to 180 degrees. The windows 344 and 346 can have a width along the longitudinal direction of the cuff body 310 in a range, for example, from 0.5 mm to 2 mm. The distance between the adjacent windows along the longitudinal direction can be in a range, for example, from 1 to 2 mm. The distance between the windows 344 and 346 and the respective ends 31 and 33 can be in a range, for example, from 0.5 mm to 2 mm.

Through the windows 344 and 346, the arcuate portions 42a and 44a can be coupled to the target nerve in the lumen 311 to deliver the stimulation signal. In some embodiments, the length/radian/surface area of the arcuate portions 42a and 44a can be increased, and the distance between the arcuate portion 42a/44a and the nerve can be decreased to enhance the coupling between the arcuate portions 42a and 44a and the target nerve. For example, the electrode elements 42 and 44 can be formed and positioned to deliver the stimulation signal with relatively safer (lower) current densities at relatively high stimulation amplitudes.

In some embodiments, the cylinder wall 310 of the inner layer 32 has a first thickness proximate to the closeable opening 312 and a second thickness at the first portion 315. The first thickness is smaller than the second thickness. In some embodiments, the thickness of the cylinder wall 310 can taper from the first portion 315 to the ends 314e and 316e proximate to the closeable opening 312. In some embodiments, the second thickness of the first portion 315 can be in the range, for example, from 1.0 mm to 2.0 mm. It is to be understood that the first portion 315 has sufficient thickness to accommodate and secure electrode elements and/or conductors coupled to the electrode elements without protruding from the outer surface 327 of the inner layer 32.

As shown in FIG. 4 or 5, the outer surface 327 of the inner layer 32 forms a cross-sectional circle having a first center 32a, the inner surface 329 of the inner layer 32 forms a cross-sectional circle (i.e., the lumen 311) having a second center 311a. The first center 32a and the second center 311a can be offset with respect to each other. In some embodiments, the offset value may be in the range, for example, from 0.25 mm to 0.75 mm.

In some embodiments, when the closeable opening 312 is closed, the cylinder wall 310 has a cross-sectional shape that is substantially circular. In other words, the outer surface 327 of the inner layer 32 has a substantially circular shape. The inner surface 329 of the inner layer 32 defining the lumen 311 can have a substantially circular shape.

As shown, an outer layer 34 is configured to overlap at least a part of the inner layer 32 and cover the closeable opening 312 to form the cuff body 30. The outer layer 34 includes an inner end portion 342 secured (e.g., by gluing) to an outer surface 327 of the inner layer 32. The outer layer 34 extends from the inner end portion 342 to overlap and releasably contact with the closeable opening 312 of the inner layer 32. In this manner, the combination of the inner layer 32 and the outer layer 34 provides an electrode cuff body that can remain securely engaged about a nerve received in the lumen 311. The cuff body 30 can automatically adjust the diameter of the lumen 311 to accommodate a swollen nerve that has a larger diameter.

In some embodiments, an electrode assembly kit can be provided, which includes a first electrode assembly and a second electrode assembly. At least one of the first electrode assembly and the second electrode assembly can be, for example, the electrode assembly 300 of FIGS. 3-5, or the electrode assembly 300' of FIG. 6. The first electrode assembly can be implanted to wrap around a first nerve such as, for example, a hypoglossal nerve. The first electrode assembly includes a cuff body having a lumen with a first inner diameter when the first electrode assembly is in use and the closeable opening is completely closed. The first inner diameter can be determined based on the size (e.g., a diameter) of the first nerve (e.g., a hypoglossal nerve) and be in the range from 2 mm to 4 mm, from 2.5 mm to 3.5 mm, or about 3.0 mm. The first electrode assembly can be implanted to wrap around a first nerve such as, for example, a hypoglossal nerve. The second electrode assembly includes a cuff body having a lumen with a second inner diameter when the second electrode assembly is in use and the closeable opening is completely closed. The second inner diameter can be determined based on the size (e.g., a diameter) of the second nerve (e.g., an ansa cervicalis nerve) and be in the range from 1 mm to 3 mm, from 1.5 mm to 2.5 mm, or about 2.0 mm.

In the embodiment depicted in FIG. 4, the inner end portion 342 of the outer layer 34 is secured to the outer surface 327 of the inner layer 32 on the right side 327R, and the outer layer 34 can extend or rotate counterclockwise with respect to the inner layer 32 to wrap around the inner layer 32. In some embodiments, the inner end portion 342 of the outer layer 34 can be secured to the outer surface 327 of the inner layer 32 on the left side 327L, and the outer layer 34 can extend or rotate clockwise with respect to the inner layer 32 to wrap around the inner layer 32.

In some embodiments, when the inner layer 32 and the outer layer 34 are assembled, the cuff body 30 has a cross-sectional shape that is substantially circular. In some embodiments, the outer layer 34 is configured to overlap with the inner layer 32 with a substantially same curvature. For example, the inner layer 32 may be void of substantial protrusions from its outer surface 327 such that the outer layer 34 can follow the surface profile of the outer surface 327 of the inner layer 32 without a filling material, a bonding material or a gap disposed therebetween.

Figure 6:
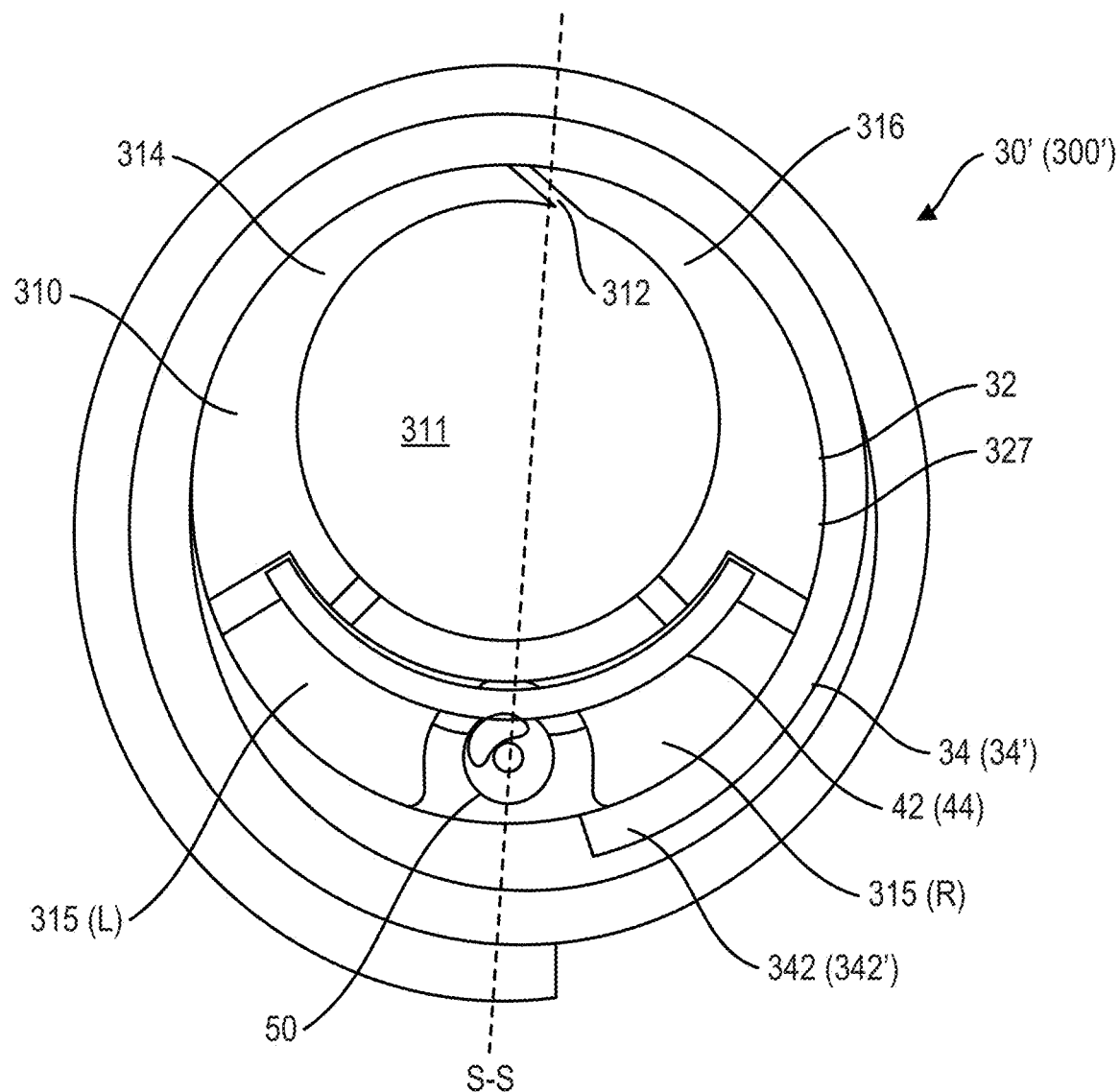
FIG. 6 is a cross-sectional view of an example electrode assembly, in accordance with embodiments of the present disclosure.

In some embodiments, the outer layer 34 can be configured to wrap around the inner layer 32 with more than one revolution. For example, as shown in FIG. 6, the electrode assembly 300' includes an outer layer 34' that wraps around the inner layer 32 with two revolutions. Generally, the longer an outer layer wrapped around an inner layer, the greater the holding force exerted by the outer layer on the inner layer. In some embodiments, the outer surface 327 of the inner layer 32 has a substantially circular shape, which allows the outer layer with a greater length to extend, clockwise or counterclockwise, and wrap around the outer surface 327 of the inner layer 32. When the inner layer 32 and the outer layer 34 (34') are assembled, it is to be understood that the outer diameter of the cuff body 30' depends on the number of revolutions of the wrapped outer layer.

In some embodiments, the cylinder wall 310 can have a left/right symmetry. For example, as shown in FIG. 6, the cylinder wall 310 is generally symmetrical about the line (plane) 66 connecting the closeable opening 312 and a middle point (line) of the first portion 315 which demarcates the left side 315L or 315 (L) and the right side 315R or 315 (R). In some embodiments, the left side 315L and right side 315R can be substantially the same. The outer layer 34 or 34' can have its inner end portion 342 (342') secured on the left side 315L or the right side 315R, depending on different implant locations (e.g., on a patient's left or right side), surgeon techniques, or lead routing preferences.

In some embodiments, the cuff body 30 including the inner layer 32 and the outer layer 34 can be formed of a flexible polymer material such as, for example, silicone. In some embodiments, the inner layer 32 and the outer layer 34 may be formed of different flexible polymer materials.

As shown in FIG. 3, a conductor 50 can extend along the longitudinal direction of the cuff body 30 to electrically couple to the electrode elements 42 and 44. The conductor 50 includes a first conductive coil 52 coupled to the electrode element 42 and a second conductive coil 54 coupled to the electrode element 44. In some embodiments, each of the conductive coils 52 and 54 can extend in parallel with respect to the arcuate portions 42a and 44a of the respective electrode elements 42 and 44 along the longitudinal direction (FIGS. 3 and 4). In some embodiments, the first and second conductive coils 52 and 54 can be coupled to a middle portion of the respective arcuate portions 42a and 44a. In some embodiments, the conductive coils 52 and 54 can be coupled to the respective arcuate portions 42a and 44a by, for example, welding or crimping, to from a mechanical and electrical joint. In some embodiments, the conductive coils 52 and 54 can be directly welded to the middle portion of the respective arcuate portions 42a and 44a to form weld joints.

As shown in the embodiment of FIG. 3, the first portion 315 of the inner layer 32 includes or is coupled to a proximal extension 315e that extends proximally to mechanically connect the cuff body 30 to a lead body (not shown). The conductor 50 can be received inside the proximal extension 315e and extend directly into the first portion 315 of the inner layer 32.

While two electrode elements (e.g., 42 and 44) and two conductive coils (e.g., 52 and 54) are illustrated in the embodiment of FIG. 3 for an electrode assembly, it is to be understood that other numbers (e.g., one, three or more) of electrode elements and the associated coils can be included for the electrode assembly. It is also to be understood that the conductor 50 can include one or more coils each being independently coupled to one of the electrode elements.

In some embodiments, the electrode elements can be formed of a biocompatible, non-corrosive electrically conductive material such as, for example, a platinum-iridium material. In some embodiments, the conductive coils can be formed of any suitable conductive materials that can be electrically and mechanically coupled to the electrode elements.

As shown, the first conductive coil 52 is connected to or coupled to a first terminal 6a of the stimulation signal generator 206. The second conductive coil 54 is connected to or coupled to a second terminal 6b of the stimulation signal generator 206. The stimulation signal generator 206 can be controlled by the controller 210 to operate in a bipolar mode or a monopolar mode.

In some embodiments, each of the electrode elements of an electrode assembly can be individually configurable to deliver bipolar stimulation or selectable monopolar stimulation. In a bipolar mode, the stimulation signal generator 206 is configured to deliver a stimulation signal to the first electrode element and the second electrode element to form a current flow between the first electrode element and the second electrode element. A "bipolar" stimulation signal can cause current flow between the first and second electrode elements to deliver the stimulation signal to one or more nerve branches adjacent to the first and second electrode elements and activate the relevant muscle(s). For example, the stimulation signal generator can deliver the stimulation signal to the first electrode element, and the caused current returns to the second electrode element. In a monopolar mode, the stimulation signal generator 206 is configured to select one or more electrode elements from the first electrode element and the second electrode element as a cathode and deliver a stimulation signal to the selected one or more electrode elements to form a current flow between the cathode and an electrode of the stimulation signal generator 206 (e.g., a shield of the stimulation generator 206). Current can passes from the selected one or more electrode elements back to the shield of the stimulation generator 206 which serves as a return electrode. For example, in some embodiments, the first electrode element connected to the first terminal of the stimulation signal generator 206 can be selected and work as a cathode to receive the stimulation signal, and current flows from the selected first electrode element back to the stimulation signal generator 206 (e.g., the shield of the stimulation signal generator 206 which serves as an anode to close the circuit loop). The first electrode element as a cathode can deliver the stimulation signal to one or more nerve branches adjacent to the first electrode element and activate the relevant muscle(s). In some embodiments, in a monopolar mode, each of the first and second electrode elements can be selected as a cathode. A "monopolar" stimulation signal can be delivered to each of the cathodes, and current can flow from the respective cathodes to the anode (e.g., the shield of the stimulation signal generator 206).

Figure 7:
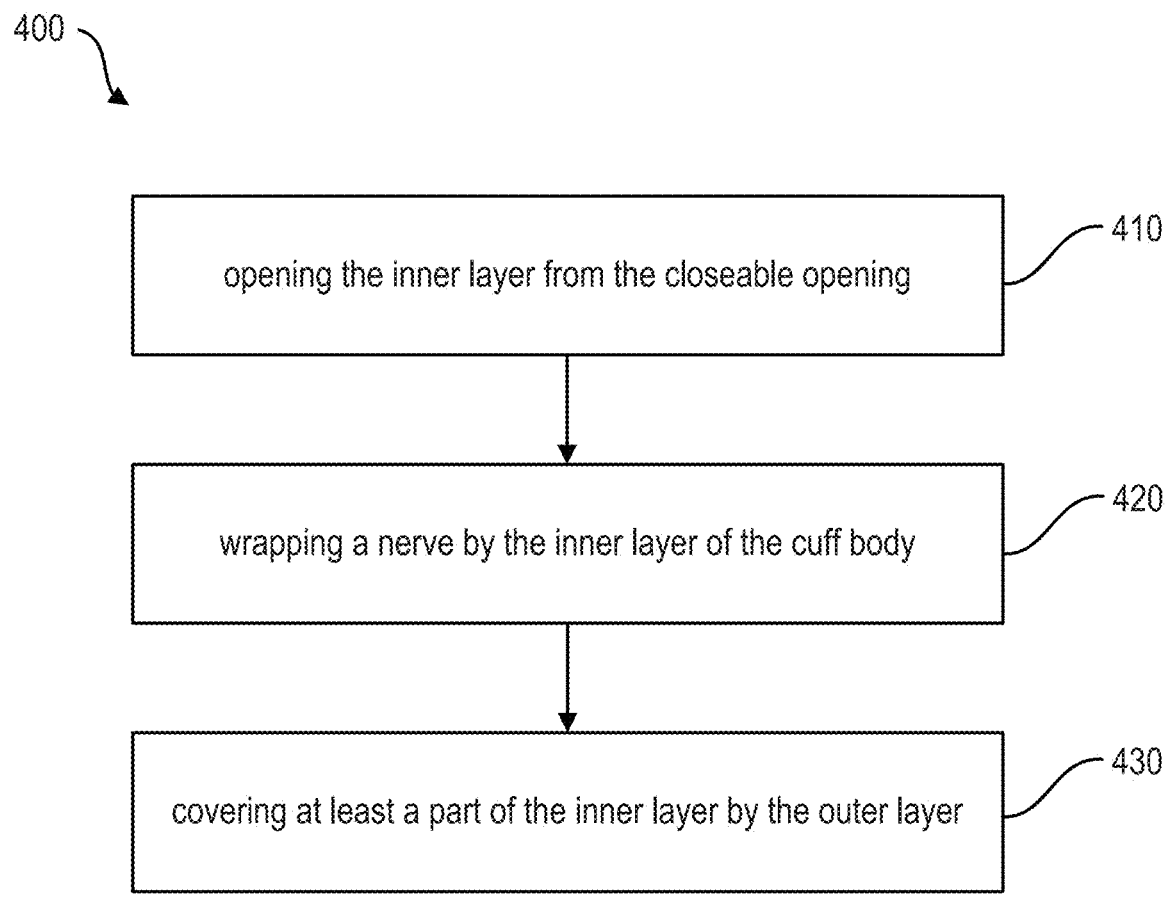
FIG. 7 is a flow diagram illustrating an example method of positioning an electrode assembly around a target nerve, in accordance with embodiments of the present disclosure.

FIG. 7 is a flow diagram of an example method 400 for delivering or positioning the electrode assembly 300 or 300' wrapped around a target nerve, in accordance with embodiments of the present disclosure. It is to be understood that any electrode assemblies can be used in the method. One or more steps or blocks of method are optional and/or can be modified by one or more steps of other embodiments described herein. Additionally, one or more steps of other embodiments described herein may be added to the method.

At process 410 of the method 400, in some embodiments, the inner layer 32 of the cuff body can be opened from the closeable opening 312. The inner layer 32 of the cuff body 30 can be deployed, for example, by a medical forceps, to receive the target nerve in the lumen 311 from the closeable opening 312. The medical forceps can manipulate the left side or right side of the inner layer 32 (e.g., the respective ends 314e and 316e of the resilient portions 314 and 316 of FIG. 4) to open the closeable opening 312 and allow the target nerve to be received in the lumen.

At process 420 of the method 400, in some embodiments, the target nerve is wrapped by the inner layer 32 of the cuff body 30. The closeable opening 312 is at least partially closed after the target nerve is received in the lumen 311 of the inner layer 32.

At process 430 of the method 400, in some embodiments, the outer layer 34 covers at least a part of the inner layer 32. The outer layer 34 has an end portion secured to the left side or the right side of the inner layer 32. The outer layer 34 is deployed to extend, clockwise or counterclockwise, to wrap around the inner layer 32 to cover at least a part of the inner layer 32. In some embodiments, the outer layer 34 can be wrapped around the inner layer with one or more revolutions. The closeable opening 312 can be completely closed after the outer layer 34 is wrapped around the inner layer 32.

Figure 8:
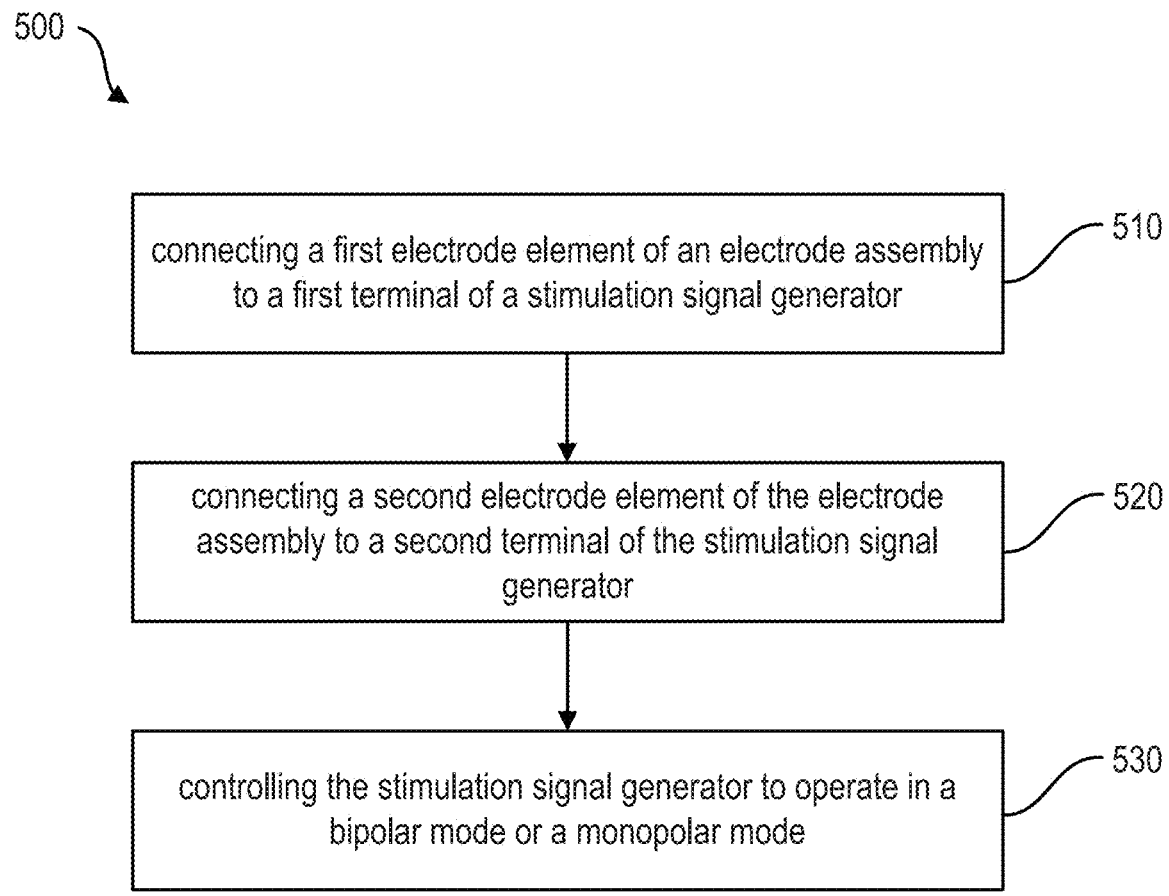
FIG. 8 is a flow diagram illustrating an example method of using an electrode assembly, in accordance with embodiments of the present disclosure.

FIG. 8 is a flow diagram of an example medical method 500 for using the electrode assembly 300, in accordance with embodiments of the present disclosure. It is to be understood that any stimulation signal generators and electrode assemblies can be used in the method. Aspects of embodiments of the method may be performed, for example, by a medical system or a controller (e.g., the medical system 200 in FIG. 2, the controller 210 in FIG. 2). One or more steps or blocks of method are optional and/or can be modified by one or more steps of other embodiments described herein. Additionally, one or more steps of other embodiments described herein may be added to the method.

According to certain embodiments, at block 510, the first electrode element 42 of the electrode assembly 300 is connected to the first terminal 6a of the stimulation signal generator 206.

At block 520, in some embodiments, the second electrode element 44 of the electrode assembly 300 is connected to the second terminal 6b of the stimulation signal generator 206.

At block 530, in certain embodiments, the stimulation signal generator 206 is controlled by the controller to operate in a bipolar mode or a monopolar mode.

In some embodiments, the stimulation signal generator 206 can be controlled to deliver a first stimulation signal to the first electrode element 42 and deliver a second stimulation signal to the second electrode element 44. The first and second stimulation signals can be delivered to stimulate certain nerve branches received in the lumen 311. In some embodiments, to avoid stimulating certain nerve branches adjacent to one of the electrode elements, the stimulation signal generator 206 can be controlled to operate in a monopolar mode. In some embodiments, a first electrode element that is relatively closer to the location at which nerve stimulation to be avoided can be selected as an anode, and a second electrode element of the same electrode assembly that is relatively far away from the location can be selected as a cathode to deliver the stimulation signal to stimulate the desired nerve branch(es). For example, as shown in FIG. 3, when the electrode assembly 300 is located such that the first end 31 is in close proximity to certain nerve branches which may activate retractor muscles of the tongue muscles (e.g., styloglossus and/or hyoglossus), the first electrode element 42 can be selected as an anode, and the second electrode element 44 can be selected as a cathode. The stimulation signal generator 206 delivers the stimulation signal only to the cathode.

Figure 9:
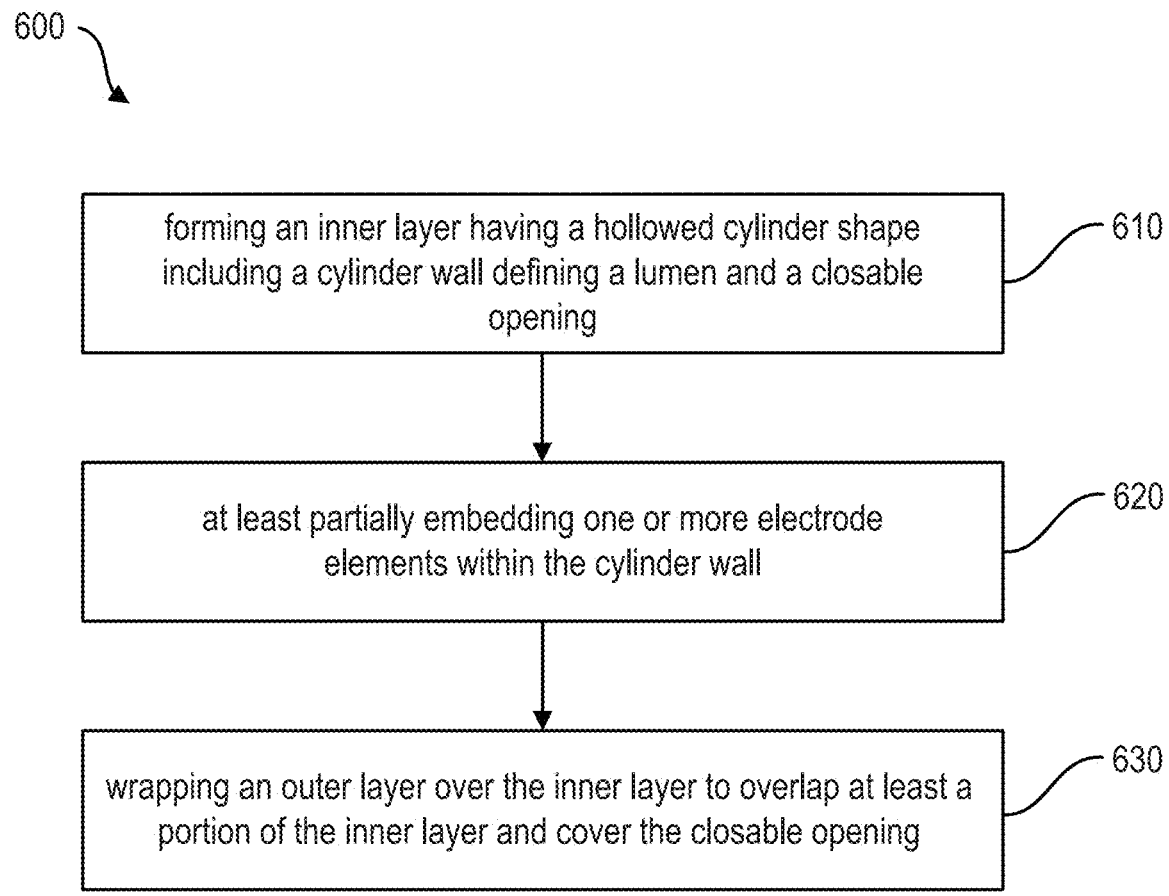
FIG. 9 is a flow diagram illustrating an example method of making an electrode assembly, in accordance with embodiments of the present disclosure.

FIG. 9 is a flow diagram illustrating an example method 600 of making the electrode assembly 300, in accordance with embodiments of the present disclosure. It is to be understood that the method 600 can be used to make any electrode assembly described herein. One or more steps or blocks of method are optional and/or can be modified by one or more steps of other embodiments described herein. Additionally, one or more steps of other embodiments described herein may be added to the method.

According to certain embodiments, at block 610, the method 600 includes forming an inner layer having a hollowed cylinder shape including a cylinder wall defining a lumen and a closeable opening on the cylinder wall accessible to the lumen. The lumen and the closeable opening extend along a longitudinal direction.

At block 620, in some embodiments, the method 600 includes at least partially embedding one or more electrode elements within the cylinder wall. The one or more electrode elements are spaced apart from each other along the longitudinal direction. Each of the one or more electrode elements includes an arcuate portion facing the lumen.

At block 630, in some embodiments, the method 600 includes wrapping an outer layer over the inner layer to overlap at least a portion of the inner layer and covering the closeable opening. In certain embodiments, the electrode assembly has a cross-sectional shape that is substantially circular.

According to some embodiments of the present disclosure, an electrode assembly includes a cuff body configured to wrap around a nerve and extending along a longitudinal direction from a proximal end to a distal end. The cuff body includes an inner layer configured to form a hollowed cylinder shape including a cylinder wall defining a lumen and a closeable opening on the cylinder wall accessible to the lumen, the lumen and the closeable opening extending along the longitudinal direction; and an outer layer configured to overlap at least a part of the inner layer and cover the closeable opening. One or more electrode elements are at least partially embedded within the cylinder wall and spaced apart from each other along the longitudinal direction, the one or more electrode elements each including an arcuate portion facing the lumen. The electrode assembly has a cross-sectional shape that is substantially circular.

In certain embodiments, the cylinder wall has a cross-sectional shape that is substantially circular, the cylinder wall includes a first portion opposite the closeable opening, and the one or more electrode elements are at least partially embedded within the first portion.

In certain embodiments, the first portion of the cylinder wall includes a one or more windows to expose one or more arcuate portions corresponding to the one or more electrode elements.

In certain embodiments, the cylinder wall has a first thickness proximate to the closeable opening and a second thickness at the first portion, wherein the first thickness is smaller than the second thickness.

In certain embodiments, an outer surface of the cylinder wall forms a first cylinder having a first cross-sectional circle with a first center, an inner surface of the cylinder wall forms a second cylinder having a second cross-sectional circle with a second center, the first center and the second center being offset with respect to each other.

In certain embodiments, the arcuate portion has a radian in a range from 45 degrees to 180 degrees.

In certain embodiments, the outer layer is configured to overlap with the inner layer with a substantially same curvature, and the outer layer is configured to wrap around the inner layer with one or more revolutions.

In certain embodiments, the electrode assembly further includes a coil extending along the longitudinal direction to electrically couple to the one or more electrode elements.

In certain embodiments, the coil includes one or more conductive coils each being independently coupled to one of the one or more electrode elements.

In certain embodiments, each of the one or more electrode elements is individually configurable to deliver bipolar stimulation or selectable monopolar stimulation.

In certain embodiments, the outer layer includes an inner end portion secured to an outer surface of the inner layer, and the outer layer extends from the inner end portion to overlap and releasably contact with the closeable opening of the inner layer.

In certain embodiments, a length of the cuff body is in a range from 4.0 mm to 8.0 mm.

According to some embodiments, an electrode assembly kit includes a first electrode assembly of the electrode assembly described above, where a lumen of a cuff body of the first electrode assembly has a first diameter when the first electrode assembly is in use, and a second electrode assembly of the electrode assembly described above, a lumen of a cuff body of the second electrode assembly has a second diameter when the second electrode assembly is in use, the second diameter being different from the first diameter.

In some embodiments, the first diameter is in a range from 2.0 mm to 4.0 mm, and the second diameter is in a range from 1.0 mm to 3.0 mm.

According to some embodiments, a method of using the electrode assembly is provided. The electrode assembly includes a cuff body extending along a longitudinal direction from a proximal end to a distal end. The cuff body includes an inner layer configured to form a hollowed cylinder shape including a closeable opening, and an outer layer configured to overlap at least a part of the inner layer and cover the closeable opening. One or more electrode elements are at least partially embedded within the inner layer. The electrode assembly has a cross-sectional shape that is substantially circular. The method includes connecting a first electrode element of the one or more electrode elements to a first terminal of a stimulation signal generator, connecting a second electrode element of the one or more electrode elements to a second terminal of the stimulation signal generator, and controlling the stimulation signal generator to operate in a bipolar mode or a monopolar mode.

In certain embodiments, the method further includes opening the inner layer from the closeable opening, wrapping a nerve by the inner layer of the cuff body, and covering at least a part of the inner layer by the outer layer.

In certain embodiments, in the bipolar mode, the stimulation signal generator is configured to deliver stimulation signal to the first electrode element and the second electrode element to form a current flow between the first electrode element and the second electrode element.

In certain embodiments, in the monopolar mode, the stimulation signal generator is configured to select one or more electrode elements from the first electrode element and the second electrode element as a cathode and deliver a stimulation signal to the selected one or more electrode elements to form a current flow between the cathode and an electrode of the stimulation signal generator.

According to some embodiments, a method of making an electrode assembly includes forming an inner layer having a hollowed cylinder shape including a cylinder wall defining a lumen and a closeable opening on the cylinder wall accessible to the lumen, the lumen and the closeable opening extending along a longitudinal direction, at least partially embedding one or more electrode elements within the cylinder wall, the one or more electrode elements being spaced apart from each other along the longitudinal direction, the one or more electrode elements each including an arcuate portion facing the lumen, and wrapping an outer layer over the inner layer to overlap at least a portion of the inner layer and covering the closeable opening. The electrode assembly has a cross-sectional shape that is substantially circular.

In certain embodiments, the method further includes encasing the one or more electrode elements within a first portion of the cylinder wall opposite the closeable opening, wherein the cylinder wall has a first thickness proximate to the closeable opening and a second thickness at the first portion, wherein the first thickness is smaller than the second thickness.

In certain embodiments, the method further includes coupling a conductor to the one or more electrode elements, wherein the conductor extends along the longitudinal direction, and the conductor includes one or more conductive coils each being independently coupled to one of the one or more electrode elements.

In certain embodiments, wrapping an outer layer over the inner layer further includes securing an inner end portion of the outer layer to an outer surface of the inner layer, and extending the outer layer from the inner end portion to overlap and releasably contact with the closeable opening of the inner layer.

According to some embodiments, a method of treatment includes delivering an electrode assembly adjacent to a target nerve, the electrode assembly comprising a cuff body extending along a longitudinal direction from a proximal end to a distal end, and the electrode assembly having a cross-sectional shape that is substantially circular; opening an inner layer of the cuff body from a closeable opening of the inner layer; wrapping the target nerve by the inner layer of the cuff body, wherein one or more electrode elements at least partially embedded within the inner layer each includes an arcuate portion facing the target nerve; and wrapping at least a part of the inner layer to cover the closeable opening by an outer layer of the cuff body.

In certain embodiments, the method further includes connecting a first electrode element of the one or more electrode elements to a first terminal of a stimulation signal generator; connecting a second electrode element of the one or more electrode elements to a second terminal of the stimulation signal generator; and controlling the stimulation signal generator to operate in a bipolar mode or a monopolar mode.

In certain embodiments, the outer layer is wrapped around the inner layer with a substantially same curvature.

In certain embodiments, wrapping at least a part of the inner layer further includes securing an inner end portion of the outer layer to an outer surface of the inner layer; and extending the outer layer from the inner end portion to overlap and releasably contact with the closeable opening of the inner layer.

Various modifications and additions can be made to the exemplary embodiments discussed without departing from the scope of the present disclosure. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

I claim:

1. An electrode assembly comprising:
a cuff body configured to wrap around a nerve and extending along a longitudinal direction from a proximal end to a distal end, the cuff body comprising:
an inner layer configured to form a hollowed cylinder shape including a cylinder wall defining a lumen and a closeable opening on the cylinder wall accessible to the lumen, the lumen and the closeable opening extending along the longitudinal direction; and
an outer layer configured to overlap at least a part of the inner layer and cover the closeable opening; and
one or more electrode elements at least partially embedded within the cylinder wall and spaced apart from each other along the longitudinal direction, the one or more electrode elements each including an arcuate portion facing the lumen,
wherein the electrode assembly has a cross-sectional shape that is substantially circular,
wherein:
an outer surface of the cylinder wall is a first cylinder and a cross-sectional shape of the first cylinder is a first circle having a first center;
an inner surface of the cylinder wall is a second cylinder and a cross-sectional shape of the second cylinder is a second circle having a second center;
the first center and the second center are offset with respect to each other.

2. The electrode assembly of claim 1, wherein the cylinder wall has a cross-sectional shape that is substantially circular.

3. The electrode assembly of claim 1, wherein:
the cylinder wall includes a first portion opposite the closeable opening, and
the one or more electrode elements are at least partially embedded within the first portion.

4. The electrode assembly of claim 3, wherein the first portion of the cylinder wall includes one or more windows to expose one or more arcuate portions corresponding to the one or more electrode elements.

5. The electrode assembly of claim 3, wherein the cylinder wall has a first thickness proximate to the closeable opening and a second thickness at the first portion, wherein the first thickness is smaller than the second thickness.

6. The electrode assembly of claim 1, wherein the arcuate portion has an angle in a range from 45 degrees to 180 degrees.

7. The electrode assembly of claim 1, wherein the outer layer is configured to overlap with the inner layer with a substantially same curvature.

8. The electrode assembly of claim 1, wherein the outer layer is configured to wrap around the inner layer with one or more revolutions.

9. The electrode assembly of claim 1, further comprising a coil extending along the longitudinal direction to electrically couple to the one or more electrode elements.

10. The electrode assembly of claim 9, wherein the coil includes one or more conductive coils each being independently coupled to one of the one or more electrode elements.

11. The electrode assembly of claim 1, wherein each of the one or more electrode elements is individually configurable to deliver a bipolar stimulation.

12. The electrode assembly of claim 1, wherein each of the one or more electrode elements is individually configurable to deliver a selectable monopolar stimulation.

13. The electrode assembly of claim 1, wherein the outer layer includes an inner end portion secured to an outer surface of the inner layer, and the outer layer extends from the inner end portion to overlap and releasably contact with the closeable opening of the inner layer.

14. The electrode assembly of claim 1, wherein a length of the cuff body is in a range from 4.0 mm to 8.0 mm.

15. The electrode assembly of claim 1, wherein the one or more electrode elements comprise a first electrode element and a second electrode element.

16. An electrode assembly kit comprising:
- a first electrode assembly of the electrode assembly of claim 1, wherein a lumen of a cuff body of the first electrode assembly has a first diameter when the first electrode assembly is in use; and
- a second electrode assembly of the electrode assembly of claim 1, wherein a lumen of a cuff body of the second electrode assembly has a second diameter when the second electrode assembly is in use, the second diameter being different from the first diameter.

17. The electrode assembly kit of claim 16, wherein:
the first diameter is in a range from 2.0 mm to 4.0 mm, and
the second diameter is in a range from 1.0 mm to 3.0 mm.

* * * * *